United States Patent [19]

Tessier

[11] Patent Number: 5,483,768
[45] Date of Patent: Jan. 16, 1996

[54] FISHHOOK SETTING DEVICE

[76] Inventor: Yvan Tessier, 913 St. Pierre, Drummondville, Quebec, Canada

[21] Appl. No.: 312,796

[22] Filed: Sep. 27, 1994

[51] Int. Cl.⁶ .......................... A01K 97/01; A01K 97/12
[52] U.S. Cl. ....................................... 43/16; 43/15
[58] Field of Search ............................. 43/15, 16

[56] References Cited

U.S. PATENT DOCUMENTS

| | | | |
|---|---|---|---|
| 2,578,887 | 12/1951 | Jackson et al. | 43/15 |
| 2,770,906 | 11/1956 | Hood | 43/16 |
| 2,924,038 | 2/1960 | Dahlgren | 43/16 |
| 3,621,599 | 11/1971 | Uhlich et al. | 43/15 |
| 3,852,905 | 12/1974 | Webb | 43/15 |
| 4,382,346 | 5/1983 | Gardner | 43/15 |
| 5,245,778 | 9/1993 | Gallegos et al. | 43/15 |

*Primary Examiner*—P. Austin Bradley
*Assistant Examiner*—Jeanne M. Elpel
*Attorney, Agent, or Firm*—Jones, Tullar & Cooper

[57] ABSTRACT

A device for automatically setting a hook in a fish uses a simple post to which the major components are assembled, which post has a pointed bottom for insertion into ice or snow, for ice fishing in the winter, or to which a appropriate clamp may be attached so that the post can be connected to other supports such as a pier or the gunwale of a boat for fishing during the other seasons. The device incorporates a signal flag and it also incorporates a spring mechanism for avoiding activation if a fish only makes a passing attempt at taking the bait, rather than a full strike. This mechanism takes the form of a lever and a first spring-loaded rod attached to a recoil mechanism. If the rod is caused to move with sufficient force it will actuate the recoil mechanism which, in turn, moves the lever and releases a second spring-loaded rod, effectively setting the hook in the fish's mouth. The recoil mechanism is adjustable so that its sensitivity can be set in accordance with the species of fish being sought. In addition, the recoil mechanism can counteract the effects of wind and hence avoid inadvertent actuation when there is no fish striking at the bait.

11 Claims, 4 Drawing Sheets

FISHHOOK SETTING DEVICE

The present invention relates to an automatic hook setter especially effective in ice-fishing situations, but also effective in other fishing situations.

BACKGROUND OF THE INVENTION

There are many devices on the market and found in the literature which purport to automatically set a hook in a fish so that a person using the device can operate a number of such devices and hence increase his catch at any time. Many such devices are spring-loaded, involving the release of a latch after a fish has taken a substantial bite at appropriate bait so that a mechanism will quickly pull the line and hook and, hopefully, set the hook in the fish's mouth. Other devices have flags or other signalling aids attached thereto so that the fisherman will easily see when a fish has been caught. Examples of prior art devices are taught in U.S. Pat. Nos. 2,578,887; 2,924,038; 3,852,905; and 4,382,346.

SUMMARY OF THE INVENTION

The present invention overcomes the problems of the prior art and presents specific advantages thereover. The invention uses a simple post to which the major components are assembled, which post has a pointed bottom for insertion into the ice or snow, for ice fishing in the winter, or to which appropriate clamping means may be attached so that the post can be connected to other supports such as a pier or the gunwale of a boat for fishing during the other seasons. The invention incorporates a signal flag and it also incorporates means for avoiding activation if a fish only makes a passing attempt at taking the bait, rather than a full strike. This means takes the form of a lever and a first spring-loaded rod attached to a recoil mechanism. If the rod is caused to move with sufficient force it will actuate the recoil mechanism which, in turn, moves the lever and releases a second spring-loaded rod, effectively setting the hook in the fish's mouth. The recoil mechanism is adjustable so that its sensitivity can be set in accordance with the species of fish being sought. In addition, the recoil mechanism is provided with appropriate means to counteract the effects of wind and hence avoid inadvertent actuation when there is no fish striking at the bait.

Generally speaking the present invention may be considered as providing a fishhook setting device comprising: elongated pole means; means for securing the pole means in ice or snow or to other solid structure; fishing line retaining means mounted to the pole means; first rod means spring-mounted to the pole means at a distal end thereof; first fishing line guide means at a free end of the first rod means; lever means pivotally mounted to the pole means intermediate the ends thereof and including adjacent one end thereof latch means cooperable with the first guide means for latching the first rod means to the lever means in a set position of the first rod means; adjustable recoil means mounted to the pole means between the lever means and the first rod means, the recoil means including extension means extendable from the recoil means against the bias of a recoil spring and having actuating means at the free end thereof, which actuating means is cooperable with the lever means at the other end thereof to move the lever means and release the first rod means from its set position; second rod means spring-mounted to a locking member of the recoil means and having second fishing line guide means at the free end thereof, the second rod means serving to release the locking member and hence the extension means upon a fish accepting bait on a hook at the free end of the fishing line, the extension means then recoiling so as to actuate the lever means and release the first rod means, thereby rapidly jerking the line and hook to set the hook in a fish's mouth.

DESCRIPTION OF THE PREFERRED EMBODIMENT

Figure 1:
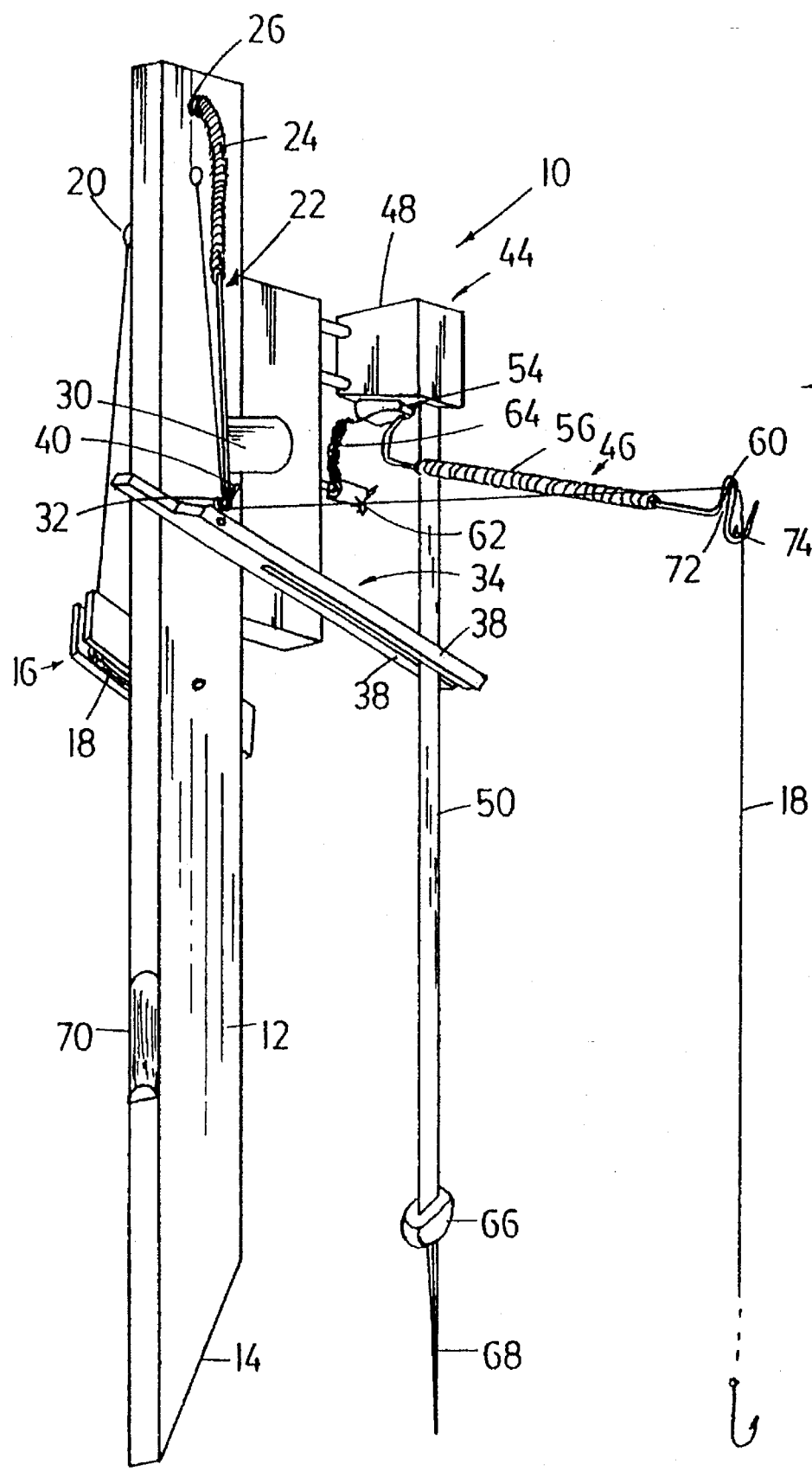
FIG. 1 is a perspective view of the hook setting device of the invention in its set condition.

FIG. 1 illustrates the hook setting device 10 of the present invention as it would be used in a ice-fishing situation. A main support pole 12 is provided, the pole having a sharpened lower or proximal end 14 which can be embedded in ice or snow surrounding a hole in the ice. The pole 12 should be sufficiently long and strong for deep insertion into the ice or snow to support the weight of the components of the device as well as the weight of any fish expected to be caught. The pole may be constructed of wood, steel, aluminum or a suitable plastics material.

At the back of the pole 12 is a bobbin or reel device 16 on which fishing line 18 can be retained. The reel device 16 is rotatable so that line can be unwound therefrom or wound thereon as desired. Since one does not usually deploy great lengths of fishing line when ice,fishing it is not necessary to have a large-capacity reel device on the pole 12. In the embodiment as illustrated the line 18 is fed through a cylindrical annular guide 20 in the upper or distal end of the pole from the back to the front of the pole. If manufacturing constraints make it inappropriate to mount the reel 16 at the back of the pole it could be mounted to the side or the front of the pole, in which case a different guide for the line 18 will be required.

Figure 3:
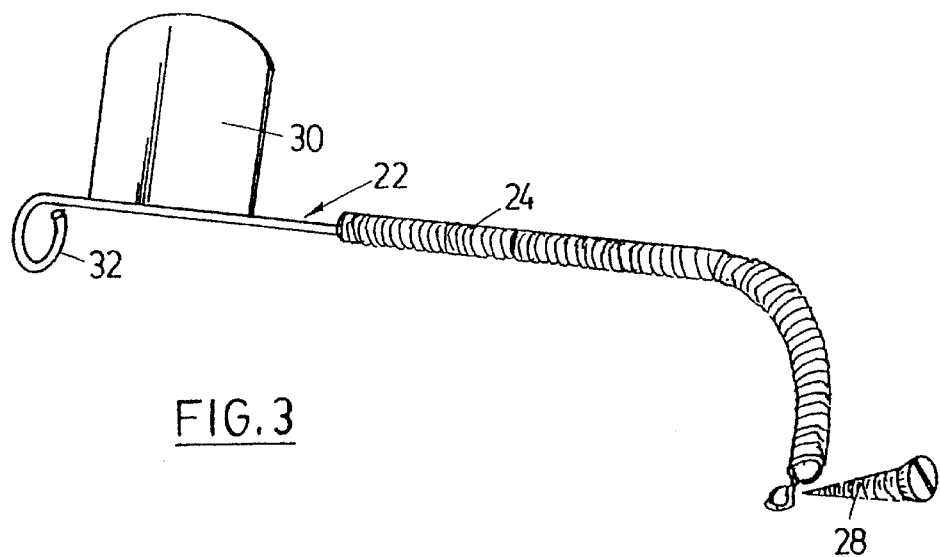
FIG. 3 is a perspective view of the first rod means used in the invention.

At the distal end of the pole is a first elongated rod member 22 which includes an elongated tightly coiled tension spring 24 at its inner end, which spring in turn is fixed at its inner end to the pole 12. Any suitable means for fixing the inner end of the spring 24 to the pole 12 may be employed. In the illustrated embodiment the spring passes through an angled hole 26 in the pole 12, is bent as shown in FIG. 3, and is secured to the back of the pole by a screw 28. This mounting arrangement tends to preload the spring 24 somewhat more than if it were attached directly to the front of the pole.

Figure 2:
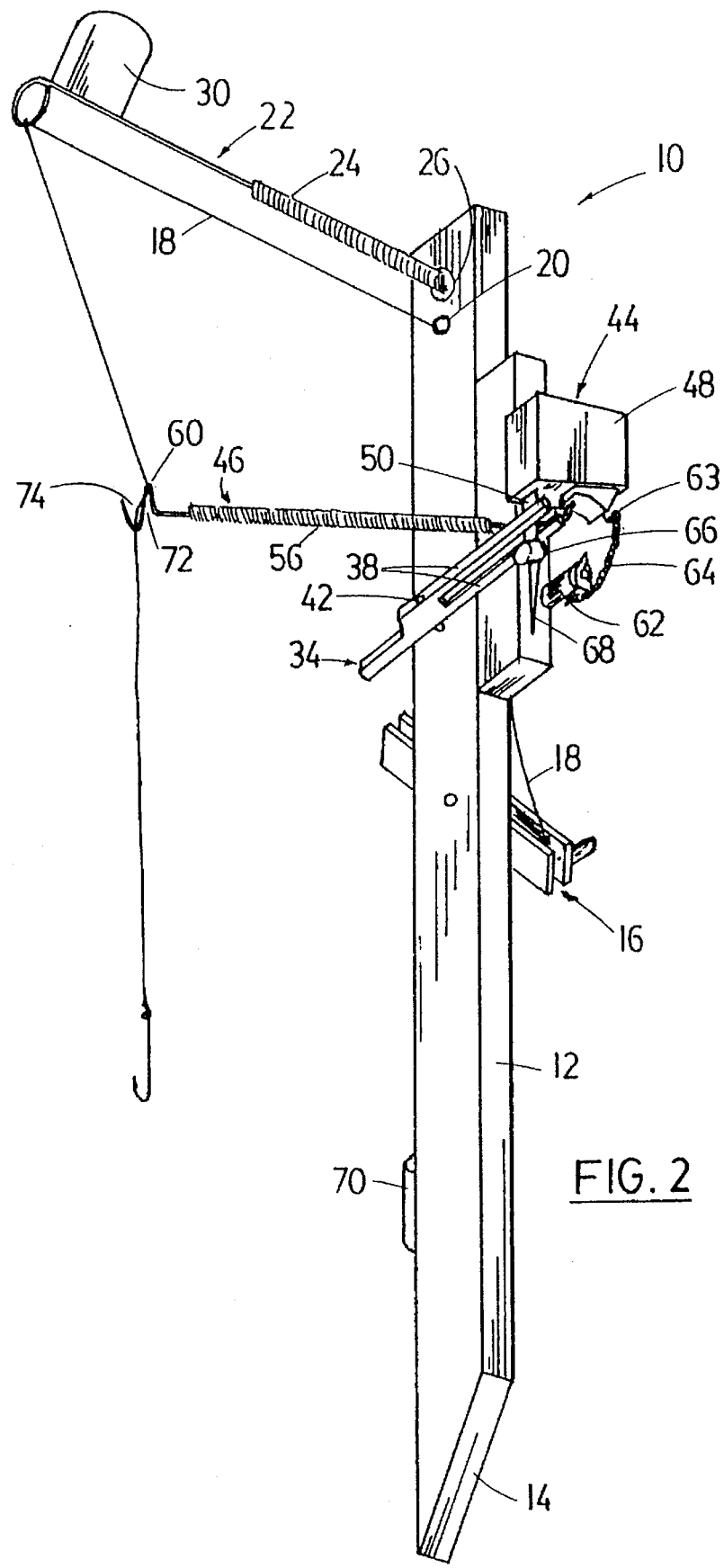
FIG. 2 is a perspective view of the hook setting device of the invention in its actuated condition.

As seen in FIGS. 1–3 the first rod member carries at its free end a signal device such as a flag 30 made of coloured plastic or sheet metal. The free end also carries a closed guide or eye 32 through which the fishing line 18 passes after it exits the guide 20. The eye 32 has an additional function which will become clear hereinafter.

Figure 4:
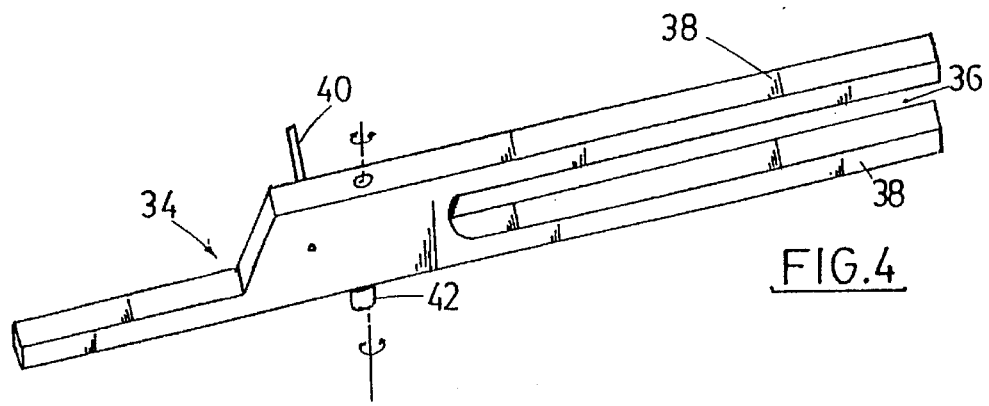
FIG. 4 is a perspective view of the lever means used in the invention.

Referring now to FIGS. 1, 2 and 4 it will be seen that a lever member 34 is pivotally mounted to the front of the pole below the first rod 22. The lever is bifurcated, with a narrow elongated gap 36 between the arms 38 thereof. The lever also carries an upright pin 40 which is engageable with the eye 32 of the first rod 22 when the device of the present invention is in its set condition as seen in FIG. 1. It is noted that the lever member is not balanced on its pivot 42, the lever member taking a normal position as seen in FIG. 1 with the bifurcated arms 38 pointing downwardly from the pivot 42 and the pin 40 being "above" the pivot.

Figure 5:
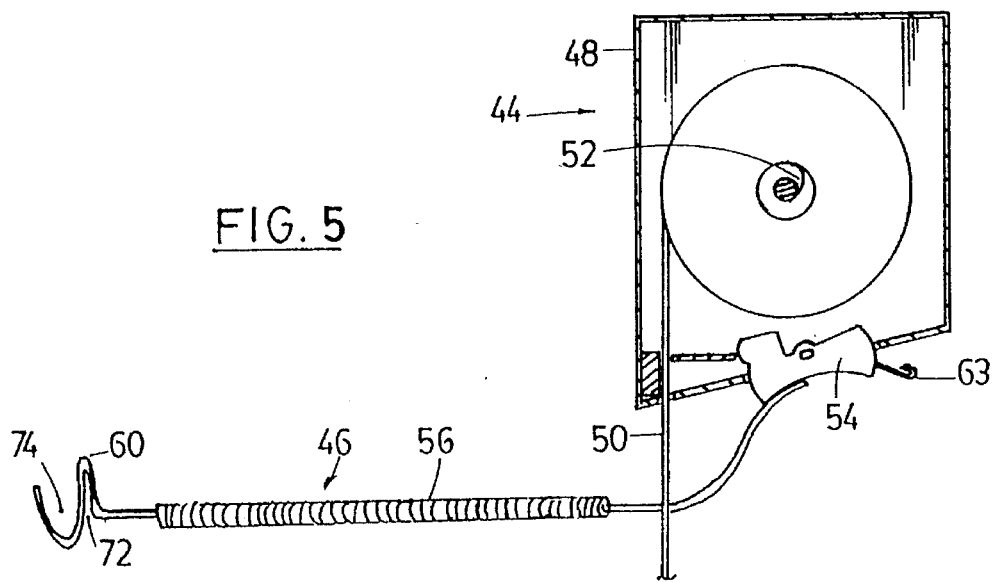
FIG. 5 is a perspective view of the second rod means and the recoil mechanism of the present invention.

FIGS. 1, 2 and 5 show the recoil mechanism 44 and the second rod member 46 of the present invention. The recoil mechanism includes a housing 48, and an extension member 50 that projects from the housing 48 and which is biased into the housing by an internal recoil spring 52. A locking member 54 projecting from the housing serves to lock the extension member at any desired position relative to the housing. The second rod member 46 is affixed at one end to the locking member and includes an intermediate coil spring 56 between the inner end and the outer end thereof. The connection to the locking member may have an offset therein to avoid interference with the extension member 50. At the outer end thereof the second rod member carries a second guide member 60, the guide member 60 having a generally sinusoidal shape, as best seen in FIG. 5.

The recoil mechanism 44 can be manufactured as a separate component or it may be a retractable tape measure as is commonly available at any hardware or department store. In this configuration the extension member would be the tape itself and the recoil spring would be the normal internal spring provided by the manufacturer of the tape measure. The locking member is the normal rocker member which, in one orientation locks the tape in any desired position, and in the other orientation allows the tape to be immediately retracted, with considerable force, under the influence of the internal recoil spring. For the present invention an external spring is provided which allows the locking member to always be biased to the tape locking orientation thereof so that the tape will be locked automatically at whatever position it is released at after having been pulled from the housing.

In order to adjust the force required to cause the extension member to retract into the housing there is provided an adjusting cylinder 62 on the pole 12 below the housing 48. A coil spring 64 is anchored at one end to the cylinder 62 and at the other end to a hook 63 on the locking member 54. By rotating the cylinder 62 it is possible to extend the spring 64 so as to bias the locking member into its locking orientation with greater or lesser force, again depending on the size of catch expected.

At its free end the extension member 50 carries a weight member 66 and a depending spike 68. The weight is positioned so that it will contact the underside of the free end of the lever member 34. The dependent spike 68 can be inserted into ice or snow to help keep the extension member from moving or flapping in any wind to which the device of the invention might be subjected.

If desired, a piece of cork or other retaining means 70 can be affixed to the proximal end of the pole 12 so as to retain the line 18 when the device is not in use. If the device is transported with a hook attached to the line the hook could be embedded in the cork to protect anyone coming close to the device.

The operation of the hook setting device of the present invention will now be described, with particular reference to FIGS. 1 and 2. It is assumed for this discussion that the device is initially in the condition as illustrated in FIG. 2.

In order to effectively utilize the hook setting device of the present invention it is first of all necessary to position and secure the device at the location of desired use. For ice-fishing the pointed end 14 of the pole 12 will be driven or pushed into the ice or snow adjacent a hole cut in the ice. Then the extension member 50 is pulled downwardly from the housing 48 by grasping the weight 66 and the spike 68 is brought close to the ice or snow. The spike is pushed into the ice or snow to hold the extension member against the force of any wind that might come up. When the extension member 50 is pulled from the housing it will be automatically locked in its extended position by the locking member 54. Furthermore, because of its unbalanced pivot the lever member 34 will take up a position with the bifurcated arms 38 thereof angled downwardly from the pivot 42. The extension member 50 is slidably received between the arms 38, in the gap 36 defined thereby.

The next step involves the setting of the device so that it is ready for fishing. The first rod member 22 is grasped and bent, through the spring 24, downwardly until the eye 32 can be positioned over the pin 40 as seen in FIG. 1. That positioning step may require some mutual manipulation of the rod member 22 and the lever 34 so that the eye 32 is properly mated with the pin 40. Then the line 18 is fed through the downwardly opening loop 72 of the guide 60 and over the upwardly opening trough 74 of the guide 60 and the baited hook at the end of the line is allowed to dangle in the water below the hole in the ice.

When a fish strikes at the baited hook and pulls on the line the first effect thereof will be on the second rod member 46, that rod being pulled downwardly against the bias of the spring 56. If the strike is small or if the fish does not take the baited hook completely there will be movement only of the rod member 46, bending at the spring 56. However, if the fish takes the bait with a strong strike it will pull the line downwardly against the trough 74, causing substantial downward movement of the rod member 46. When this happens the rod member 46 causes the locking member 54 to rock in the housing 48, releasing the hold that the locking member had on the extension member 50. The recoil spring in the housing pulls the extension member back into the housing with considerable force and speed and the weight member 66 rapidly ascends towards the lever member 34. The weight member 66 strikes the free end of the bifurcated arms 38, causing the lever member 34 to pivot upwardly, releasing the eye 32 from the pin 40 as the other end of the lever member rotates downwardly. When the eye 32 is released the spring 24 attached to the inner end of the first rod member 22 biases the rod member 22 upwardly with considerable speed and force, causing a rapid hook setting movement on the line 18. The fish should be caught. The flag 30 is now in a raised position, signalling that the device has been actuated and that there should be a caught fish on the hook. If the fish was lucky enough to avoid being caught the fisherman will quickly detect that fact and he can reset the device after checking to see whether the hook needs additional bait. If the fish was caught the fisherman will draw in the line, release the fish and reset the device for further fishing.

Figure 6:
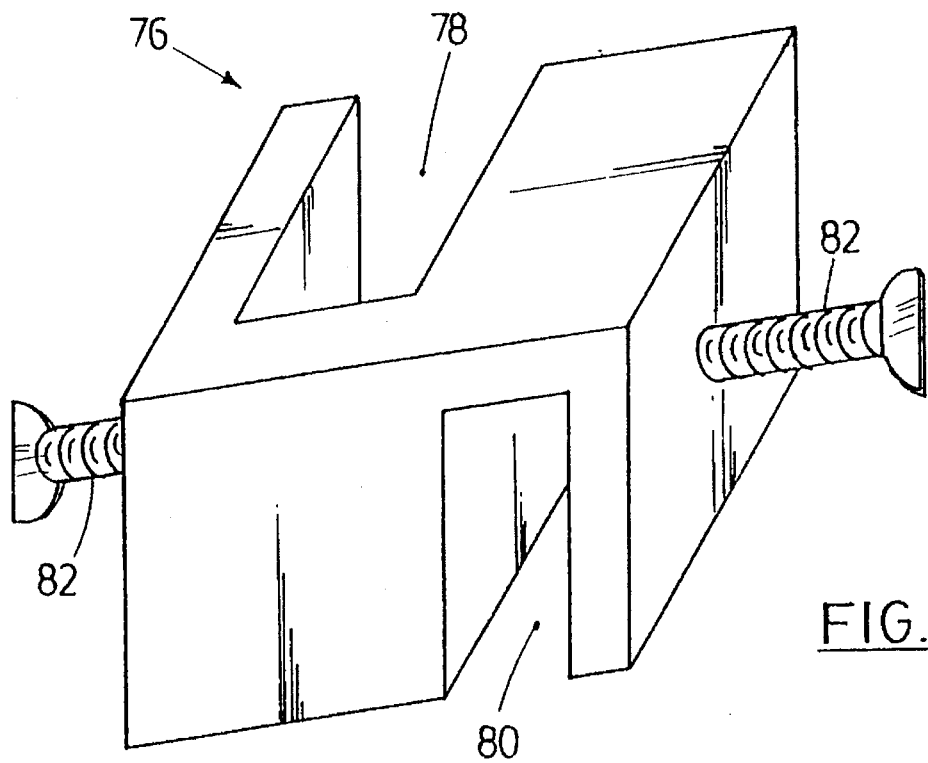
FIG. 6 is a perspective view of a clamp mechanism that will allow the device of this invention to be used in situations other than ice-fishing.

The foregoing description is based on the device of the invention being used for ice-fishing. It can, of course, be used in other situations year round. The only modification required is in the means for mounting the pole 12 and an appropriate means 76 is illustrated in FIG. 6, which means can be used to affix the pole 12 to the gunwale of a boat or to any other lateral support. The mounting means 76 takes the form of a double clamp, each portion thereof being of a generally U-shape, defining gaps 78 and 80 respectively. A threaded clamp member such as thumbscrew 82 is provided in the free leg of each clamp portion for clamping action against the pole 12 when received in the gap 78 and for clamping action against the gunwale of a boat received in the gap 80. Of course, a suitable clamp mechanism could be permanently affixed to the pole 12 so that it would not be necessary to carry a separate clamp mechanism such as the one illustrated herein. Also, the illustrated clamp mechanism is but one of many configurations that could be used with the device of the present invention, the particular one to be used depending on the actual location at which the device is to be used.

Figure 7:
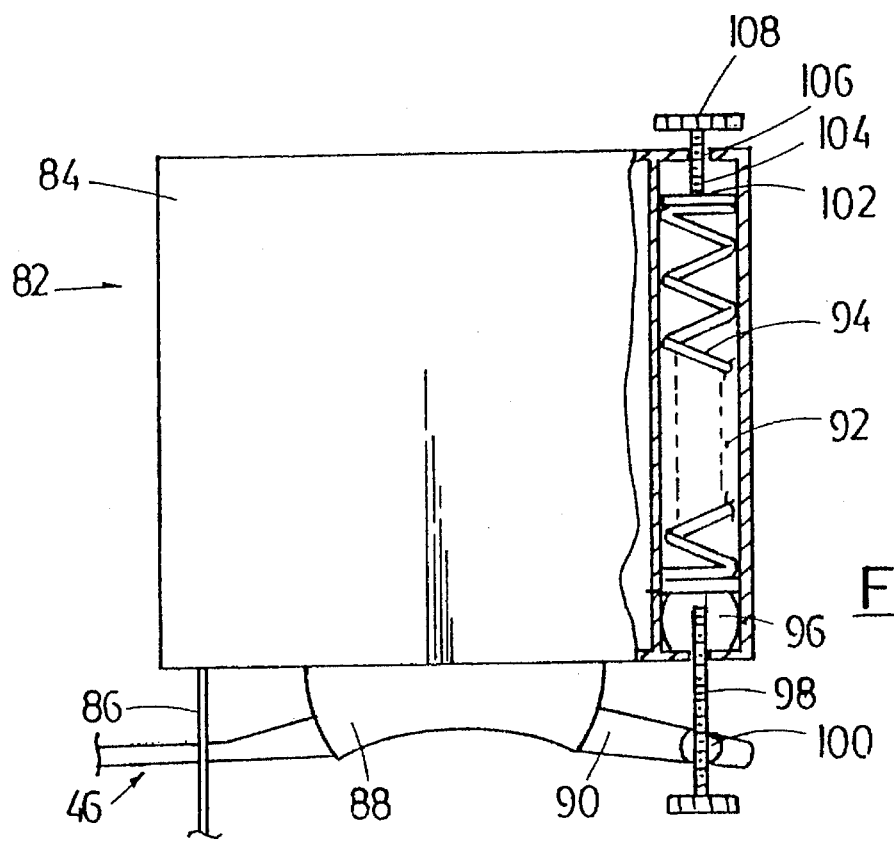
FIG. 7 shows an alternative configuration for the recoil mechanism used in this invention.

FIG. 7 shows in partial cross-section an alternative recoil mechanism 82 that might be used with the present invention. The housing 84 contains an extension member 86 such as a flexible metallic tape and a recoil spring (not shown) operative to retract the member 86 back into the housing with considerable force and speed. The locking member takes the form of a rocker 88 to which the second rod member 46 is attached as in the previously described embodiment. The manner in which the locking member operates is also unchanged.

The rocker 88 has a rearward, extension 90 and the housing 84 has a compartment 92 in which a compression spring 94 resides. At one end the spring abuts a piston member 96 which is threadably attached to a connecting rod 98, the connecting rod 98 being threaded through a lateral cylinder 100 pivotally mounted at the end of the extension 90. At its other end the spring 94 abuts a moveable plate 102 against which the end of a threaded rod 104 abuts. The rod 104 is threaded through a mating threaded hole 106 in the housing 82 and has a knurled enlarged head 108. By turning the threaded rod 104 via the head 108 it is possible to adjust the amount by which the spring 94 is initially compressed and thereby adjust the reactionary force thereof bearing on the piston member 96. This in turn adjusts the force required to be imparted to the rocker 88 by a striking fish to cause the rocker 88 to release the extension member 86 and thereby initiate the hook setting movement of the lever member 34 and the first rod member 22.

The device of the present invention has specific advantages over other hook setting devices available at the present time. It is simple in execution. It has proven effective in automatically catching fish of various species. It is effective in all weather conditions, including extreme cold. It can be used for fishing from a boat or a pier as well as for ice-fishing. It has superior hook setting action in comparison to conventional devices, and it always presents the same hook setting force when actuated. It is adjustable in that the strength of a strike that will actuate the device can be predetermined. Tiny bites or strikes need not actuate the device and, hopefully, undersized fish will not be caught. The device can be set and deployed by anyone, including a child. The device can be set and left on its own; it is therefore a good means for exploring the fishing possibilities of new sites in summer or winter.

The foregoing has described the preferred embodiment and certain possible modifications thereto. It is of course possible that a skilled individual would be able to effect modifications to the structure of the invention without departing from the spirit thereof. Accordingly the protection to be afforded to the present invention is to be determined from the claims appended hereto.

I claim:

1. A fishhook setting device comprising:

elongated pole means;

means for securing said pole means in ice or snow or to other solid structure;

fishing line retaining means mounted to said pole means;

first rod means spring-mounted to said pole means at a distal end thereof;

first fishing line guide means at a free end of said first rod means;

lever means pivotally mounted to said pole means intermediate the ends thereof and including adjacent one end thereof latch means cooperable with said first guide means for latching said first rod means to said lever means in a set position of said first rod means;

adjustable recoil means mounted to said pole means between said lever means and said first rod means, said recoil means including extension means extendable from said recoil means against the bias of a recoil spring and having actuating means at the free end thereof, which actuating means is cooperable with said lever means at the other end thereof to move the lever means and release said first rod means from its set position;

second rod means spring-mounted to a locking member of said recoil means and having second fishing line guide means at the free end thereof, said second rod means serving to release said locking member and hence said extension means upon a fish accepting bait on a hook at the free end of the fishing line, said extension means then recoiling so as to actuate said lever means and release said first rod means, thereby rapidly jerking the line and hook to set the hook in a fish's mouth.

2. The fishhook setting device of claim 1 wherein said first rod means includes a tightly coiled extension spring at one end thereof for attachment to said pole means, said first guide means being an eye member at the other end of said first rod means.

3. The fishhook setting device of claim 2 wherein said lever means includes a pair of spaced arms between which said extension means can pass adjacent the other end thereof, said latch means comprising a pin projecting from said lever means for engagement with said eye member of said first rod means.

4. The fishhook setting device of claim 3 wherein said actuating means is a weight member affixed to the free end of said extension means.

5. The fishhook setting device of claim 4 including a spike member projecting from said weight member to anchor said extension means in ice or snow.

6. The fishhook setting device of claim 4 wherein said second guide means at the free end of said second rod means includes an upwardly opening trough portion and a downwardly opening inverted U-shaped portion.

7. The fishhook setting device of claim 6 wherein said second rod member includes a tightly coiled tension spring intermediate and interconnecting the ends thereof.

8. The fishhook setting device of claim 7 including a rotatable cylinder member mounted to said pole means and a tension spring interconnecting said cylinder member and said locking member so as to bias said locking means towards a position at which it automatically locks said extension member against retraction there of.

9. The fishhook setting device of claim 7 wherein said recoil means includes a housing from which said extension means can extend, a separate compartment containing a compression spring, a piston member operably bearing against one end of said compression spring, a threaded rod member connected to said piston member and an extension of said locking member, a plate member at the other end of the compression spring, and a threaded adjustment rod bearing on said plate member and threadably passing through a threaded opening in said housing for adjusting the compression in said compression spring and hence the force required to release said locking member and said extension means.

10. The fishhook setting device of claim 1 wherein said mounting means includes clamping means securable to said pole means and to other support means for clamping said pole means to such support means.

11. The fishhook setting device of claim 1 wherein said mounting means includes a sharpened section at a proximal end of said pole means for insertion into ice or snow.

* * * * *